UNITED STATES PATENT OFFICE.

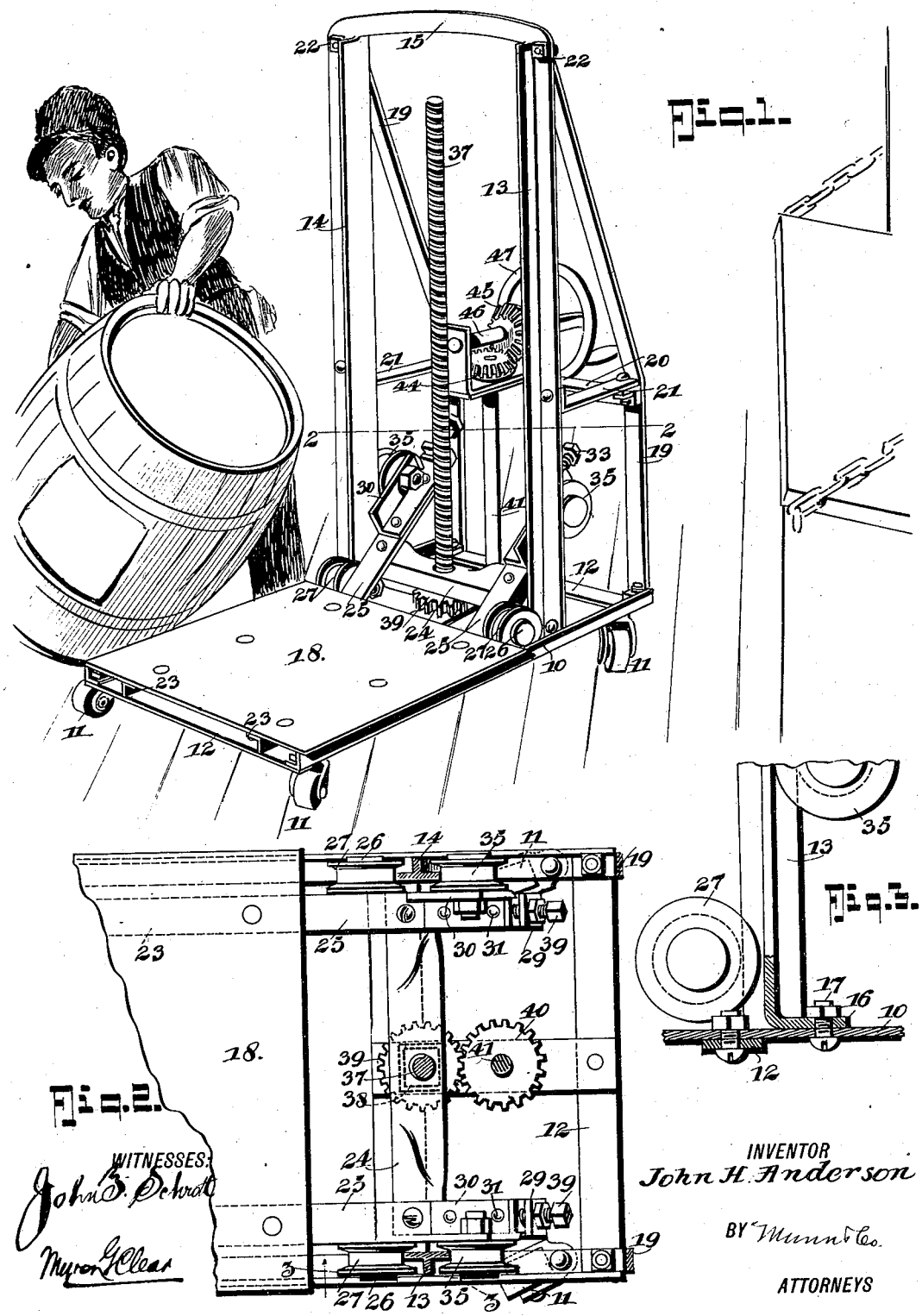

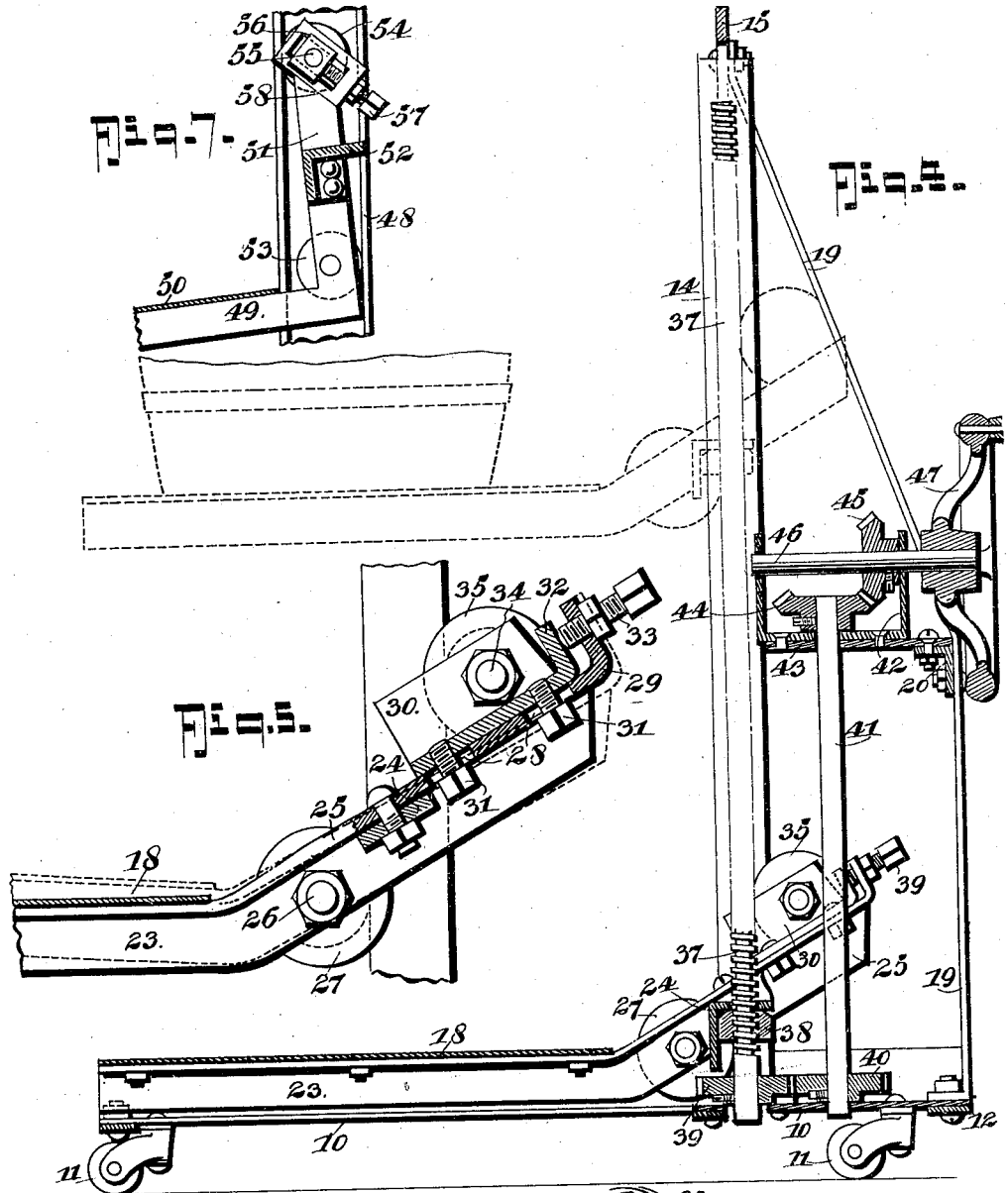

JOHN H. ANDERSON, OF HAVANA, NORTH DAKOTA.

ELEVATING-TRUCK.

1,228,162.  Specification of Letters Patent.  Patented May 29, 1917.

Application filed February 7, 1916. Serial No. 76,657.

*To all whom it may concern:*

Be it known that I, JOHN H. ANDERSON, a citizen of the United States, and a resident of Havana, in the county of Sargent and State of North Dakota, have invented a certain new and useful Improvement in Elevating-Trucks, of which the following is a specification.

My present invention relates generally to elevating trucks, or portable elevators, and particularly to mechanism of this type employing the constructional features which will be hereinafter distinctly pointed out, my object being to provide a mechanism of this character which will be strong and durable, highly effective for the purpose intended, and at the same time, simple and inexpensive, as far as devices of this nature go.

The preferred embodiment of my invention, together with certain variations thereof, are shown in the accompanying drawings, which form a part of this specification, and in which—

Figure 1 is a perspective view of my improvements, illustrating a practical application thereof.

Fig. 2 is a horizontal section taken through the rear portion thereof, substantially on line 2—2 of Fig. 1.

Fig. 3 is a detail vertical section taken substantially on line 3—3 of Fig. 2.

Fig. 4 is a vertical longitudinal section taken centrally therethrough.

Fig. 5 is a detail longitudinal section through the rear portion of the platform.

Fig. 6 is a detail perspective view of a portion of the frame of the platform and adjacent parts.

Fig. 7 is a view similar to Fig. 5, and illustrating a slight modification.

Referring now to these figures, my invention provides a main portable frame including a horizontal rectangular base frame 10 mounted upon rollers or caster wheels 11, and the side portions of which are preferably in the form of angle bars connected by suitably bolted cross strips and to which the lower portions of uprights 13 and 14, integrally joined at their upper ends by a cross bar 15, are connected.

Each of the uprights 13 and 14, which, as seen in Figs. 1 to 6 inclusive, may be T-shaped in form, with its rib projecting laterally and outwardly, may have the lower extremity of its said rib in the form of an extension bent parallel to the respective side bar of the lower frame 10 as seen at 16 in the detail Fig. 3, and connected thereto by a bolt 17, it being noted that this connection of the lower ends of each upright is made with the lower frame 10 at a point intermediate the ends of the latter and a short distance rearwardly of the body 18 of the platform, vertically extending braces 19 being bolted at their lower ends to the rear extremities of the side bars of the lower frame 10 and to a cross bar 20 connecting the rear ends of strips 21, the forward ends of the latter of which are secured to the uprights 13 and 14 intermediate the ends of the latter. Above the cross strip 20 the upright braces 19 are bent forwardly at an angle to provide for securing their upper extremities to the upper ends of the uprights 13 and 14 as by bolts 22.

The main body 18 of the platform rests upon a frame consisting of spaced parallel angle bars 23, the rear ends of which are bent upwardly at an angle beyond the rear end of the body 18 and connected by an angular cross piece 24. Each of the angular rear ends 25 of bars 23 is provided forwardly of the cross bar 24 with a rigid laterally projecting stub shaft 26 upon which is mounted a roller 27 engaging the forward side guide of its respective upright 13, 14, and each of these angular rear ends 15 is provided at points rearwardly of the cross bar 24, with longitudinal slots 28, as best seen in Figs. 5 and 6, and has its rear end upturned at an angle as seen at 29.

Mounted upon the rear extremities of the angular rear portions 25 thus formed, are adjustable brackets 30, each of which has guide bolts 31 depending through the slots 28 and each of which has a rear upturned end 32 forwardly of and opposing the rear upturned end 29 before described, whereby it may be controlled by an adjusting bolt threaded through the latter upturned end and abutting the said upturned end 32. Each of these brackets 30 is also provided with a rigid laterally projecting stub shaft 34 upon which is journaled a roller 35 engaging the rear side guide of the respective upright 13, 14, it being thus noted that, as the rollers 27 and 35 thus engage respectively opposite sides of the uprights at vertically spaced points, the platform will be effectively guided in its vertical movement and may be leveled at any time by simply adjusting the member 33 to advance or retract roller 35 and raise and lower the platform upon roller 27 as a fulcrum, such movement of the platform being evident by a comparison of the full and dotted lines in Fig. 5.

The cross bar 24 has a central opening 36 through which a vertical screw shaft 37 loosely extends, this screw shaft being engaged by a nut 38 non-rotatably held by the cross bar 24, and in the angle of the latter whereby upon rotation of the screw shaft 37, the platform and its frame will be raised or lowered upon its guides before described, dependent upon the direction of such rotation of the screw shaft.

The lower end of screw shaft 37, as best seen in Fig. 4, is loosely disposed in an aperture in the base frame 10, so as to permit the screw shaft which, as best seen in Fig. 1, is otherwise unsupported, to yield under slight angular movement of the platform during vertical movement of the latter, and thus prevent or obviate binding and jamming and all unnecessary friction, an arrangement which the enlarged aperture 36 of the cross bar 24 and the particular manner in which the nut 38 is held by the latter as before described, obviously supplements.

Adjacent its lower end the screw shaft 37 has secured thereto a spur gear 39 in mesh with a similar gear 40 upon the lower end of a vertical parallel shaft 41, the upper end of which projects through the base of a bearing bracket 42 secured upon a support 43 extending forwardly from the rear cross bar 20 before described, the upper extremity of shaft 41 having secured thereon a bevel gear 44. This bevel gear 44 is in mesh with a similar bevel gear 45 secured upon a horizontal shaft 46, journaled through the bracket 42 just mentioned and provided upon its rear end with an operating hand wheel 47, rotation of which is communicated through shaft 41 and the gears described, to the vertical screw shaft 37 to impart vertical movement to the platform.

In Fig. 7 I have shown a slight modification as to the guide features of the platform in its vertical movement, it being proposed in accordance with this figure to provide uprights in the form of channel beams 48 and to have the rearwardly extending bars 49 of the platform 50 bent upwardly at substantially a right angle thereto, as indicated at 51. It is further proposed to connect these angular rear ends 51 by a cross bar 52 corresponding to the cross bar 24 before described, and to mount laterally projecting rollers 53 and 54 adjacent the lower and upper ends of the angular portions 51 to extend within the channels of the beams 48, the upper roller 54 having its stub shaft 55 carried by a bearing block 56 adjustable, under control of an adjusting bolt 57, within an open angular frame 58 rigid with the upper end of each angular portion 51. Thus the rollers 53 and 54 engage relatively opposite sides of the upright guides at vertically spaced points, the same as before described in connection with the rollers 27 and 35 in the form of the invention shown in Figs. 1 to 6 inclusive, and the upper roller 54 being adjustable, permits of leveling the platform in substantially the same manner as before stated, in connection with the platform 18.

It will thus be seen that I provide a simple, inexpensive, and effective arrangement for the purpose, in so far as mechanisms of this character go, that I provide for maximum flexibility and minimum friction, and that I obtain as a result thereof a strong and durable truck, well adapted to the portage and elevation of heavy articles and goods in the several uses to which mechanism of this character may be conveniently put.

I claim:—

1. An elevating truck comprising a portable frame including spaced uprights, a platform movable vertically in the frame and having supporting bars provided with rearwardly and upwardly inclined rear ends between the said uprights, a guide roller carried by the lower inner portion of each of said inclined rear ends and engaging one side of the respective upright, and a roller adjustably supported by the rear upper end of each of the said angular rear ends and engaging the relatively opposite side of the respective guide at a point vertically spaced from the point engaged by the first roller and adjusting means for adjusting the upper rollers under pressure.

2. An elevating truck comprising a portable frame including spaced uprights, a platform movable vertically in the frame and having supporting bars provided with angularly disposed rear ends, means for moving said platform vertically in the frame, guide rollers carried by said angular rear ends of said bars and engaging the said uprights at relatively opposite sides thereof, and means for adjusting one of the rollers at each side of the platform under pressure whereby to control the level thereof with respect to the weight of a load thereon.

3. An elevating truck comprising a main portable frame having an opening, a platform carried thereby and vertically movable with respect thereto, a screw shaft extending in a vertical direction in the main frame provided with an upper free end and having its lower end loosely stepped in the said opening of the frame, operative connections between said shaft and said platform permitting relative angular movements thereof and coöperating with the frame opening to support the shaft in operative position, and means in the main frame for rotating said screw shaft.

4. An elevating truck comprising a portable frame including spaced uprights, a platform movable vertically in the frame and having supporting bars provided with rearwardly and upwardly inclined rear ends between the said uprights, guide rollers carried by the lower inner portions of each of said inclined rear ends, and engaging one side of the said uprights, rollers at the upper outer portions of said inclined rear ends, and engaging the opposite side of the said uprights, brackets upon which the said rear rollers are mounted, adjustably connected to the said inclined ends of the platform bars, the upper rear extremities of the said inclined ends of the platform bars being upturned, and adjusting screws threaded through the said upturned extremities and bearing against the brackets of the rear rollers whereby the latter may be adjusted under pressure to level the platform with a load thereon.

JOHN H. ANDERSON.